(12) United States Patent
Hasegawa

(10) Patent No.: US 8,318,383 B2
(45) Date of Patent: Nov. 27, 2012

(54) FUEL CELL REACTION LAYER

(75) Inventor: Norifumi Hasegawa, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 733 days.

(21) Appl. No.: 12/086,400

(22) PCT Filed: Dec. 15, 2006

(86) PCT No.: PCT/JP2006/325011
§ 371 (c)(1),
(2), (4) Date: Jun. 12, 2008

(87) PCT Pub. No.: WO2007/069710
PCT Pub. Date: Jun. 21, 2007

(65) Prior Publication Data
US 2009/0162735 A1     Jun. 25, 2009

(30) Foreign Application Priority Data
Dec. 16, 2005  (JP) ................................. 2005-363428

(51) Int. Cl.
*H01M 4/02*  (2006.01)
(52) U.S. Cl. ......... 429/523; 429/530; 429/531; 429/532
(58) Field of Classification Search .................. 429/523, 429/524, 525, 528, 529, 530, 531, 532, 534, 429/484, 485, 487; 427/115; 502/101
See application file for complete search history.

(56) References Cited

U.S. PATENT DOCUMENTS

| | | | |
|---|---|---|---|
| 7,569,302 B2 * | 8/2009 | Tanaka et al. | 429/494 |
| 2004/0115516 A1 | 6/2004 | Miyake et al. | 429/42 |
| 2004/0227129 A1 | 11/2004 | Hasegawa | 252/500 |
| 2005/0104045 A1 | 5/2005 | Hasegawa | 252/500 |
| 2005/0214631 A1 | 9/2005 | Hirashige | 429/44 |

FOREIGN PATENT DOCUMENTS

| | | |
|---|---|---|
| JP | 10-255832 | 9/1998 |
| JP | 11-335165 | 12/1999 |
| JP | 2000-018811 | 1/2000 |
| JP | 2000-251533 | 9/2000 |
| JP | 2001-110428 | 4/2001 |
| JP | 2001-202971 | 7/2001 |
| JP | 2002-536787 | 10/2002 |
| JP | 2003-068321 | 3/2003 |
| JP | 2003-200052 | 7/2003 |
| JP | 2005-135671 | 5/2005 |
| JP | 2005-174834 | 6/2005 |
| JP | 2005-276746 | * 10/2005 |
| JP | 2005-294175 | 10/2005 |
| WO | WO 2004/102588 | * 11/2004 |

* cited by examiner

*Primary Examiner* — Raymond Alejandro
(74) *Attorney, Agent, or Firm* — Bacon & Thomas, PLLC

(57) ABSTRACT

Disclosed is a fuel cell reaction layer which is excellent in durability and heat resistance while having a low operation temperature. In addition, supply of an oxygen gas to the fuel cell reaction layer is hardly disturbed. Also disclosed are a fuel cell and a method for producing such a fuel cell reaction layer. Specifically disclosed is a fuel cell reaction layer wherein a mixed conductive catalyst is used. The mixed conductive catalyst includes a conductive carrier composed of an electron conductor formed of carbon and a proton conductor formed of an inorganic material. The electron conductor is an inorganic material comprising a polymerized and carbonized organic monomer: the proton conductor is an inorganic material, and the electron conductor and the proton conductor are bonded together. In addition, a water-repellent carbon is further blended in this fuel cell reaction layer.

8 Claims, 7 Drawing Sheets

HYDROGEN ELECTRODE    NAFION FILM    AIR ELECTRODE

EVALUATION CELL

HYDROGEN ELECTRODE   NAFION FILM   AIR ELECTRODE

FUEL CELL CHARACTERISTICS

CONDITIONS  CELL TEMPERATURE : 50°C   HYDROGEN ELECTRODE   SATURATED HUMIDITY ATMOSPHERE   ATMOSPHERIC PRESSURE   AIR ELECTRODE   SATURATED HUMIDITY   ATMOSPHERIC PRESSURE

FUEL CELL REACTION LAYER

TECHNICAL FIELD

The present invention relates to an improved fuel cell reaction layer.

BACKGROUND ART

The reaction layer of a fuel cell is formed between an electrolyte film and a diffusion layer, which supports a catalyst which accelerates the electrochemical reaction. For example, in the reaction layer on the air electrode side, protons that pass through the electrolyte film and electrons transmitted to the air electrode are introduced to catalysts, whereby the oxygen ions and protons diffused among the catalysts bond together. That is to say, in order to improve the transmission loss of the oxygen ions, protons, and electrons, there is a need to form the reaction layer such that it has both proton conductivity and electron conductivity. Accordingly, a conventional material used for such a reaction layer is formed by mixing carbon particles (having electron conductivity), on the surface of which the catalysts are supported, and an organic polymer material having proton conductivity such as Nafion (trademark: manufactured by Du Pont, as well as the following trademarks) or the like (see FIG. 1B).

However, such an arrangement in which a material having proton conductivity and another material having electron conductivity are mixed at a macro level has a problem of a difficulty in creating a completely uniform mixture thereof. This leads to a problem in that there are many regions having structures that differ from the structure (three-phase interface) which provides a reactant path, a proton path, and an electron path around the catalyst, leading to a difficulty in smoothly introducing the electrode reaction.

In order to solve this problem, it has been proposed that a mixed conductor having both proton conductivity and electron conductivity at the molecular structure level is employed as a catalyst carrier. With such a mixed conductor, a part having proton conductivity and another part having electron conductivity are positioned extremely closely to each other at a microscopic level, i.e., molecular structure level, thereby reducing such parts having structures that differ from the particular structure (three-phase structure) which provides the reactant path, the proton path, and the electron path around the catalyst. This provides rapid progress of the electrode reaction.

For example, Patent documents 1 through 4 disclose a catalyst supporting carrier employing an organic mixed conductor.

Also, Patent documents 5 through 8 disclose a catalyst supporting carrier employing an inorganic mixed conductor.
[Patent Document 1]
Japanese Patent Application Publication No. JP-A-2001-202971
[Patent Document 2]
Japanese Patent Application Publication No. JP-A-2001-110428
[Patent Document 3]
Japanese Patent Application Publication No. JP-A-2003-68321
[Patent Document 4]
Japanese Patent Application Publication No. JP-A-2002-536787
[Patent Document 5]
Japanese Patent Application Publication No. JP-A-1998-255832
[Patent Document 6]
Japanese Patent Application Publication No. JP-A-1999-335165
[Patent Document 7]
Japanese Patent Application Publication No. JP-A-2000-251533
[Patent Document 8]
Japanese Patent Application Publication No. JP-A-2000-18811

DISCLOSURE OF THE INVENTION

Problem to be Solved by the Invention

However, such a catalyst supporting carrier employing the aforementioned organic mixed conductor has many problems with respect to durability and thermal stability due to the nature of the organic material.

Whereas the catalyst supporting carrier employing the aforementioned inorganic mixed conductor operates at a high temperature (around 800° C.), in some cases, such a carrier is unsuitable for a small-size fuel cell that is suitable for a vehicle or a portable device.

A catalyst supporting carrier still has not been proposed that has mixed conductivity, i.e., which has both proton conductivity and electron conductivity, and which can be applied to a fuel cell that operates at a temperature ranging from an ordinary temperature to an intermediate temperature (room temperature to 200° C.).

As a result of diligent study by the present inventor in order to solve the aforementioned problems, the present inventor has discovered a novel inorganic catalyst supporting carrier having mixed conductivity. That is to say, the present inventor has discovered a mixed conductive carrier formed of an electronic conductor composed of carbon and a proton conductor composed of an inorganic material. Such a carrier exhibits improved durability and thermal stability as compared with catalyst supporting carriers that employ an organic mixed conductor. Furthermore, with such an arrangement, an appropriate proton conductor formed of an inorganic material is employed, which reduces the operating temperature as compared with catalyst supporting carriers that employ the aforementioned inorganic mixed conductor. Furthermore, a catalyst is supported by the carrier thus created, thereby obtaining a supported metal catalyst. Moreover, a reaction layer is formed for a fuel cell using the aforementioned supported metal catalyst, thereby providing a fuel cell having the aforementioned reaction layer. Patent applications have already been filed with respect to these inventions (PCT/JP2005/14442).

However, the inorganic catalyst supporting carrier having mixed conductivity, which has been proposed by the present inventor et al., has the nature of being highly water absorbent. Accordingly, in a case of employing such a catalyst supporting carrier for the reaction layer on the air electrode side, the catalyst supporting carrier readily holds the water that is formed by the electrode reaction. In some cases, this leads to a difficulty in supplying oxygen gas.

The present invention has been made in view of the aforementioned problems. Accordingly, it is an object of the present invention to provide a fuel cell reaction layer and a fuel cell, which have improved durability and thermal stability, and which operate at a reduced temperature, and which prevent the occurrence of difficulty in supplying oxygen gas, and a manufacturing method for such a fuel cell reaction layer.

Means for Solving the Problems

A fuel cell reaction layer according to the present invention includes a mixture of: a mixed conductive catalyst in which a catalyst is supported by a mixed conductive carrier composed of an electron conductor formed of carbon and a proton conductor formed of an inorganic material; and a water-repellent agent. With such an arrangement, the mixed conductive carrier is manufactured by a method in which an organic monomer and an inorganic monomer are mixed together, and a polymer precursor obtained by polymerizing at least the organic monomer is carbonized.

The mixed conductive carrier thus obtained has a structure in which an electron conductive portion and a proton conductive portion are mixed together at a microscopic level, specifically, at a molecular-structure level. This increases a portion that provides a structure necessary for the electrode reaction (three-phase structure), which provides the reactant path, the proton path, and the electron path around each catalyst, thereby accelerating the electrode reaction. Furthermore, such an arrangement employs the mixed conductive carrier formed of an inorganic material, thereby offering improved durability and thermal stability, as compared with mixed conductive carrier formed of an organic material. Furthermore, employment of the proton conductor structure provides the operation at relatively low temperature. Furthermore, with such an arrangement, the electron conductor and the proton conductor are strongly bonded, thereby preventing the mixed conductive carrier from dissolving in water.

A catalyst suitable for the fuel cell reaction, such as platinum, alloy of platinum, etc., is supported by the mixed conductive carrier thus obtained, thereby forming a mixed conductive catalyst. In this specification, a mixed conductive catalyst has a structure in which a catalyst, which is selected as desired, is supported by the aforementioned mixed conductive carrier. In particular, with an arrangement employing a mixed conductive catalyst in which a catalyst suitable for the fuel cell reaction such as platinum or the like is supported, electrons, protons, and oxygen ions are supplied to all the catalysts supported by the surface of the carrier. Thus, all the catalysts operate in this state. The formation of a fuel cell reaction layer employing the mixed conductive catalyst thus obtained improves the utilization factor of the catalyst, thereby improving the reaction efficiency of the fuel cell.

On the other hand, with practically available conventional fuel cell reaction layers having a structure in which the supported metal catalyst in which a catalyst is supported by an electron conductive carrier (carbon particles or the like) and an ion-exchange resin have been mixed together at a macroscopic level, in some cases, the ion-exchange resin (Nafion or the like) cannot be in contact with the catalyst supported by a recessed portion of the electron conductive carrier, as shown in FIG. 1B. In this case, no proton is supplied to such a catalyst, making no contribution to the fuel cell reaction. The speed of the gas passing through the ion-exchange resin is extremely low, as compared with the gas passing through the gaseous phase. Accordingly, excessive coating of the ion-exchange resin on the supported metal catalyst prevents the supply of gas, leading to deterioration in the fuel cell performance. On the other hand, the size of the ion-exchange resin changes due to drying or humidification. In some cases, the change in the size of the ion-exchange resin leads to a problem of separation of the catalyst from the carrier which is a catalyst supporter.

Furthermore, a water-repellent agent is added to the fuel cell reaction layer according to the present invention. Accordingly, there is almost no water around the water-repellent agent, which forms a region where gas passes smoothly, thereby accelerating the electrode reaction. Thus, in particular, the fuel cell reaction layer according to the present invention is preferably employed on the air electrode side where water is generated in the electrode reaction, which prevents the smooth passage of the oxygen gas.

As the water-repellent agent, water repellent powder may be employed. While electron non-conductive materials such as PTFE powder, silicon water-repellent agents, etc., can be employed as the water-repellent agent, electron-conductive water-repellent agents are more preferably employed. The reason is that the electron-conductive water-repellent agent provides a function as an electron conductive path. Such an arrangement ensures the electron path, in addition to the material path which allows the oxygen gas to pass through, thereby accelerating the electrode reaction. Example of such electron conductive water-repellent agents include water-repellent carbon, fluorinated carbon, etc. The amount of the water-repellent agent to be added is not restricted in particular and is preferably adjusted as appropriate according to the supported platinum density.

The electron conductor is formed of carbon with the principal chains of double bonds, triple bonds, or both of the double bonds and the triple bonds, as shown in FIG. 2 and FIG. 3. The electron conductor which provides an electron conduction function via the principal chains thereof may be employed Also, the electron conductor which provides an electron conduction function via the side chains thereof may be employed.

Also, an electron conductor which is formed of an inorganic material may be obtained as follows. That is to say, an organic monomer having $\pi$-bonds is polymerized, and the organic polymer thus obtained is carbonized so as to form an inorganic material, thereby preparing the electron conductor. Such an electron conductor exhibits improved electron conductivity, thereby being preferably employed. Examples of such organic monomers include acetylene, resorcinol, phenol, 2-phenylphenol, aniline, pyrrole, thiophene, phenylphosphonic acid, phenylsilane-alkoxide group, pyrogallol, and dihydroxybiphenyl.

Also, as the proton conductor formed of an inorganic material, a compound containing phosphorous, a compound containing sulfur, carboxylic acid, boric acid, an inorganic solid acid may be employed. In particular, at least one of a compound containing phosphorous, phosphoric acid, phosphate ester, sulfuric acid, sulfuric ester, sulfonic acid, tungsten hydroxide, rhenium hydroxide, silicon oxide, stannic oxide, zirconium oxide, tungstophosphoric acid, tungstosilicic acid, and silicon oxide may be employed.

According to the invention, the reaction layer is formed of an electron conductor formed of carbon and an inorganic proton conductor. With an arrangement in which the electron conductor and the proton conductor are bonded together with covalent bonds so as to form a compound, the inorganic conductor and the proton conductor are strongly bonded with covalent bonds. With such an arrangement, there is almost no proton conductor which separates from the mixed conductive carrier according to the present invention, even if the mixed conductive carrier is soaked in water. Furthermore, such a mixed conductive carrier provides both the electron conduction function and the proton conduction function. FIG. 2 and FIG. 3 show the state in which the electron conductor and the proton conductor are bonded by covalent bonds. The distance between each of the electron conductors 1 and 3 and the proton conductor 2 is extremely small, which allows both the electron conductors 1 and 3 and the proton conductor 2 to be in contact with a nano-order catalyst particle (e.g., platinum etc.) as shown in the drawings. This allows the suitable amounts of protons and electrons necessary for the catalysis reaction to be supplied.

Let us consider an arrangement without involving copolymerization of an electron conductor formed of carbon and a proton conductor. With such an arrangement, it is assumed that each proton conductor is intercalated between the carbon principal chains, or each proton conductor is included in the net structure formed of the carbon principal chains. It is assumed that such an arrangement provides the proton conduction function as long as the distance between the adjacent proton conductors is sufficiently small.

As described above, the proton conductors and the electron conductors formed of carbon are bonded together with covalent bonds so as to form a compound. Alternatively, such a proton conductor is bonded to, intercalated between, or included in the carbon structure. Such a structure prevents each proton conductor to separate from the mixed conductive carrier and prevents these proton conductors from flowing out with water even if the catalyst supporting carrier is used with water. Furthermore, such an arrangement prepared in the form of a single material provides both the electron conduction function and the proton conduction function. That is to say, the risk of deterioration in the proton conductivity due to water is greatly reduced.

The mixed conductive carrier used for the fuel cell reaction layer according to the present invention may be formed as follows. That is to say, first, an organic monomer and an inorganic monomer are mixed together. Then, a polymer precursor is formed by polymerizing at least organic monomer. Furthermore, the polymer precursor is carbonized.

As the organic monomer, at least one from among acetylene, resorcinol, phenol, 2-phenylphenol, aniline, pyrrole, thiophene, phenylphosphonic acid, phenylsilane-alkoxide group, pyrogallol, and dihydroxybiphenyl, may be employed. These organic monomers have π-bonds, thereby allowing an elongated conjugated system to be formed with π-bonds by carbonization. Thus, such an arrangement exhibits improved electron conductivity.

Also, the inorganic monomer may be at least one from among a compound containing phosphorous, a compound containing sulfur, carboxylic acid, boric acid, and an inorganic solid acid. Such an inorganic monomer provides high proton conductivity.

The catalyst supporting carrier according to the present invention may be prepared as follows. That is to say, a manufacturing method for the fuel cell reaction layer according to a first aspect of the present invention includes: a first step in which an organic monomer and an inorganic monomer are mixed together, and at least the organic monomer is polymerized, thereby obtaining a polymer precursor; a second step in which the polymer precursor obtained in the first step is calcined, thereby obtaining a mixed conductor; a third step in which a catalyst is supported by the mixed conductor obtained in the second step, thereby obtaining a mixed conductive catalyst; and a fourth step in which a mixture of the mixed conductive catalyst obtained in the third step and a water-repellent agent is molded.

In the manufacturing method for the fuel cell reaction layer according to a first aspect of the invention, in the first step, an organic monomer and an inorganic monomer which is a proton conductive material are mixed together. At least the organic monomer is polymerized so as to form a polymer precursor. In a case in which the inorganic monomer is a phosphate ester, the inorganic monomer is also preferably hydrolyzed and condensed using an acid.

Next, in the second step, the polymer precursor is calcinated. In this step, as shown in FIG. 2 or FIG. 3, it is assumed that the organic polymer chains are carbonized, which forms a π-bonds conjugated system having electron conductivity. Furthermore, in this step, it is assumed that the proton conductors and the organic polymer thus carbonized are bonded together with covalent bonds, thereby forming a mixed conductor having a structure in which the carbon principal chains, which serve as an electron conductor, are cross-linked through the proton conductors. Also, in an arrangement in which the degree of the polymerization is small with respect to the inorganic monomer, it is assumed that the inorganic monomer is adsorbed to an organic polymer, thus formed from the organic monomer, by intercalation or inclusion. Also, with such an arrangement, it is assumed that, at the same time, there are proton conductors each of which is bonded with covalent bonds to an electron conductor formed of carbon, and proton conductors each of which is substantially in the separated state.

Such a microscopic structure is small as compared with a catalyst particle. Accordingly, both the proton path and the electron path are formed around a single catalyst particle. Furthermore, application of a sufficient amount of inorganic monomer reduces the distance between the adjacent proton conductors bonded to the carbon chains with covalent bonds, thereby providing a proton conductivity therebetween.

Subsequently, in the third step, a desired metal having a catalyst function is supported by the mixed conductive carrier thus obtained, thereby obtaining a mixed conductive catalyst. The catalyst supporting method is not restricted in particular. A desired known method may be employed. As a metal used for the catalyst, in particular, a noble metal such as Pt or the like is preferably employed, since such a noble metal exhibits high catalytic activity.

Then, in the forth step, a water-repellent agent is applied to the mixed conductive catalyst. Such an arrangement provides a material path which almost eliminates water around the water-repellent agent, thereby ensuring the smooth movement of oxygen gas. Furthermore, the mixed conductive catalyst thus obtained is molded, thereby obtaining the reaction layer for the fuel cell having a structure (three-phase interface) which provides the reactant path, the proton path, and the electron path around each catalyst. With regard to the molding method, for example, the supported metal catalyst is dispersed in water, alcohol, or the like, so as to form a paste which is a mixture thereof. The paste is applied to one surface of the diffusion layer, thereby forming the reaction layer. Furthermore, the reaction layer and the diffusion layer thus applied are applied to both faces of an electrolyte film (Nafion film, in this example), thereby forming a fuel cell unit which is a component of a fuel cell, i.e., a unit cell. Also, the paste may be applied to the diffusion layer side so as to form a reaction layer. Also, PTFE, Nafion, etc., may be added to the paste as a binder.

Also, supported metal catalyst powder may be molded into a desired electrode shape by hot pressing, thereby forming the reaction layer.

Also, as another preparation method for the fuel cell reaction layer according to the present invention, an arrangement may be made in which the proton conductor is dispersed in a polymer formed of an organic monomer, following which the proton conductor thus dispersed is polymerized.

That is to say, the manufacturing method for the fuel cell reaction layer includes: a first step in which an organic monomer is polymerized, following which an inorganic monomer is added to the organic polymer thus obtained, and the inorganic monomer thus added is polymerized, thereby obtaining a polymer precursor; a second step in which the polymer precursor obtained in the first step is calcinated, thereby obtaining a mixed conductor; a third step in which a catalyst is supported by the mixed conductor obtained in the second step, thereby obtaining a mixed conductive catalyst; and a fourth step in which a mixture of the mixed conductive catalyst obtained in the third step and a water-repellent agent is molded.

According to the aforementioned manufacturing method, in the first step, after the polymerization of the organic monomer, the inorganic monomer is added and polymerized, thereby obtaining the polymer precursor. In a case in which the organic monomer polymerization conditions differ from the inorganic monomer polymerization conditions, such a two-step polymerization is employed. Such an arrangement allows both the organic monomer and the inorganic monomer to be polymerized under the respective optimum conditions. This improves the degree of polymerization with respect to both the organic monomer and the inorganic monomer, thereby improving the proton conductivity.

Also, in the manufacturing method according to a first aspect of the invention, and the manufacturing method according to another aspect of the invention that differs from the first aspect of the invention, the polymer precursor is preferably heated or pressure heated before the calcination of the polymer precursor.

The heating processing or the pressure heating processing performed on the polymer precursor accelerates the condensation of the polymer precursor. This increases the proton conductor concentration after the calcination. The method for heating or pressure heating the polymer precursor is not restricted in particular. The generally available methods may be employed.

With a reflux method in which the precursor in its boiling state is heated, the vapor thus generated is returned to the reaction chamber in the form of liquid by cooling. Accordingly, a refrigerator is preferably provided to the reaction chamber. The reflux method allows the temperature of the polymer precursor to be increased without increasing the pressure of the atmosphere of the precursor. The temperature and the period for the heating are adjusted as appropriate according to the properties of the polymer precursor.

Also, the method for pressure heating the polymer precursor is not restricted in particular. From the point of view of operability and the like, an autoclave is preferably employed. The atmospheric pressure and the temperature of the polymer precursor are adjusted as appropriate according to the properties of the polymer precursor.

With regard to the carbonization of the polymer precursor, the polymer precursor is preferably calcinated under an inert gas atmosphere. The inert gas atmosphere can be provided by placing the polymer precursor under a flow of argon gas, nitrogen gas, or helium gas, or in a vacuum state. The polymer precursor is heated under the inert gas atmosphere thus provided, which carbonizes organic components, thereby forming an inorganic material. If the principal chains of the organic components have $\pi$-bonds, such an arrangement exhibits high electron conductivity.

The heating temperature and the heating time are adjusted as appropriate according to the properties of the polymer precursor.

Also, high energy may be applied in addition to the heat processing, at the same time as or after the heat processing. Examples of such applications of high energy include plasma exposure, microwave irradiation, ultrasonic irradiation, etc.

A fuel cell may be formed using the fuel cell reaction layer according to the present invention. That is to say, the reaction layers according to the present invention and the electrolytic layer are layered using hot pressing so as to form a single molded unit having a structure in which the electrolytic layer is sandwiched between the reaction layers. Furthermore, a diffusion layer is applied to the outer face of the reaction layer, thereby forming a unit cell of a fuel cell.

BEST MODES FOR CARRYING OUT THE INVENTION

Description will be made below regarding specific Examples 1 and 2 according to the present invention and a Comparative Example 1.

Example 1

[Preparation of the Mixed Conductive Carrier]

Figure 1A:
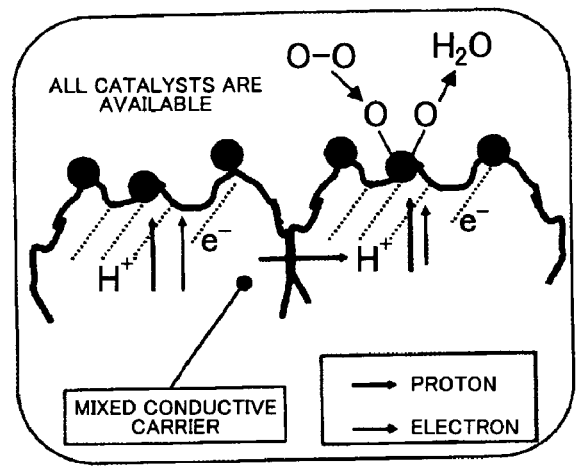
FIG. 1A is a schematic diagram which shows a mixed conductive catalyst.
Figure 1B:
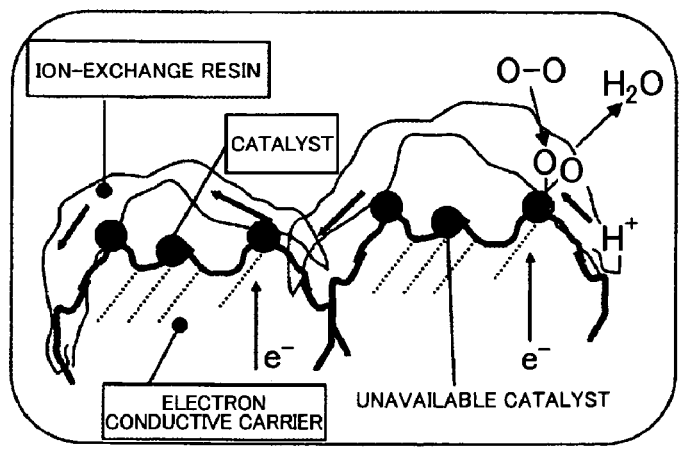
FIG. 1B is a schematic diagram which shows an electron conductive supported catalyst.
Figure 2:
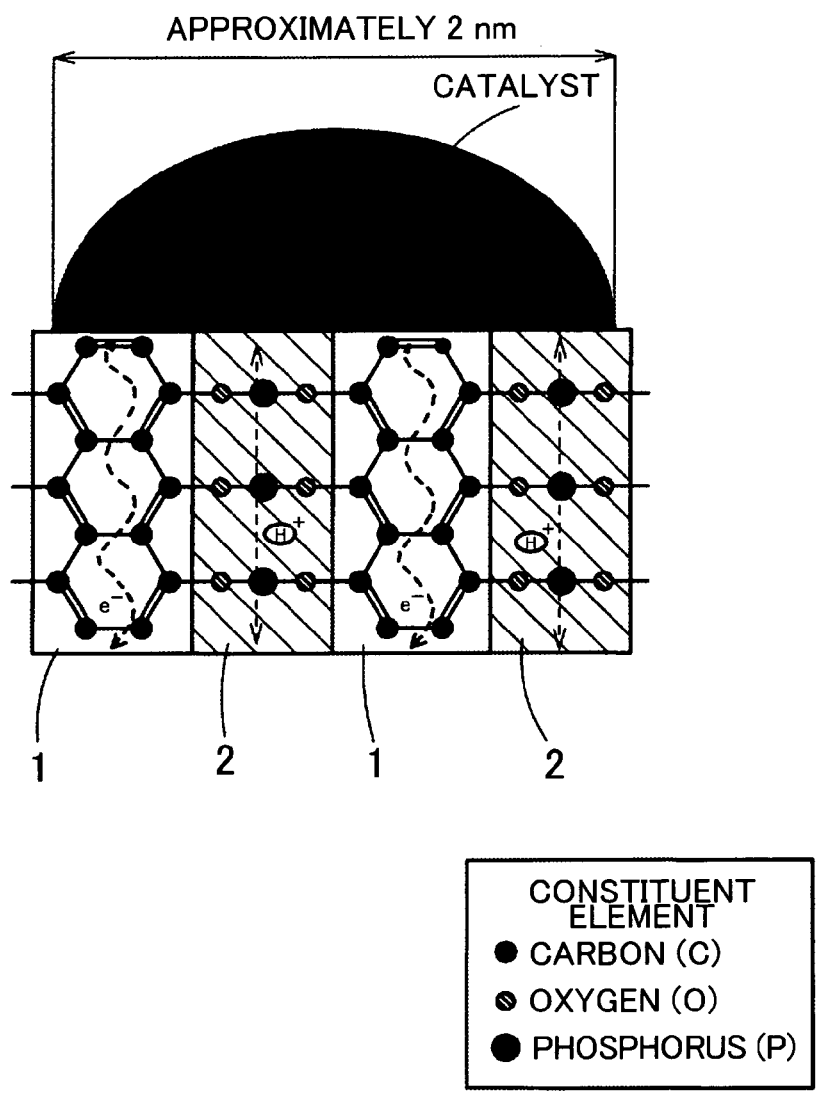
FIG. 2 is a schematic diagram which shows a structure of a mixed conductive catalyst according to the present invention.
Figure 3:
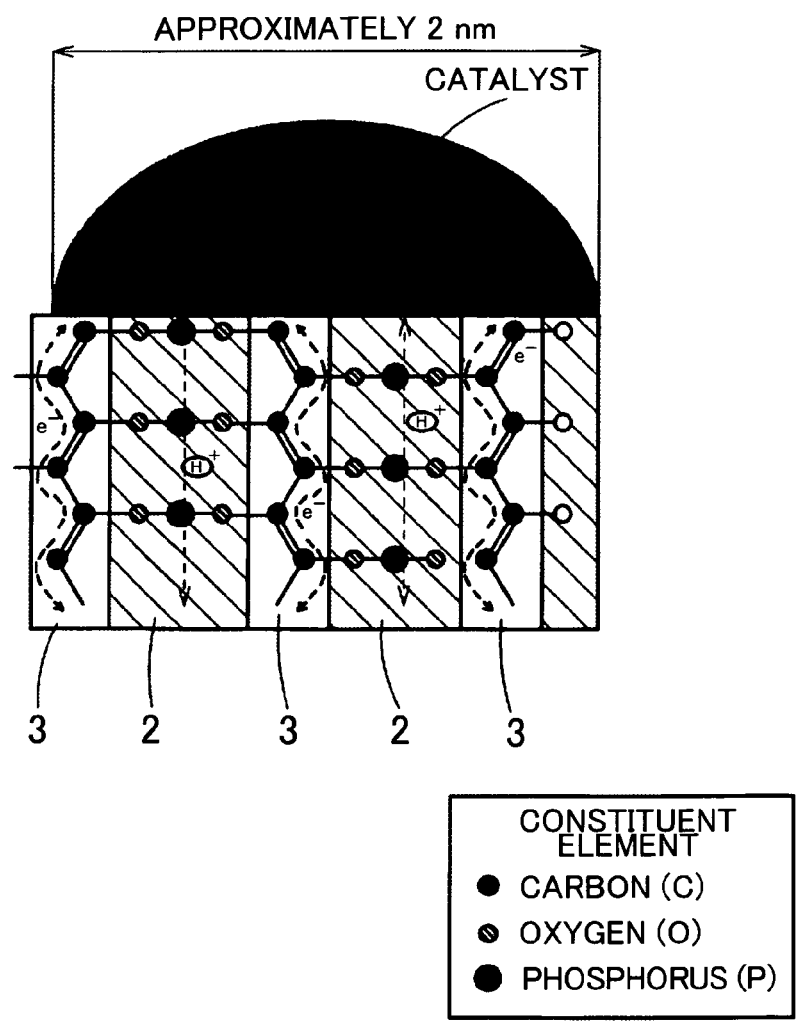
FIG. 3 is a schematic diagram which shows a structure of a mixed conductive catalyst according to the present invention.
Figure 4:
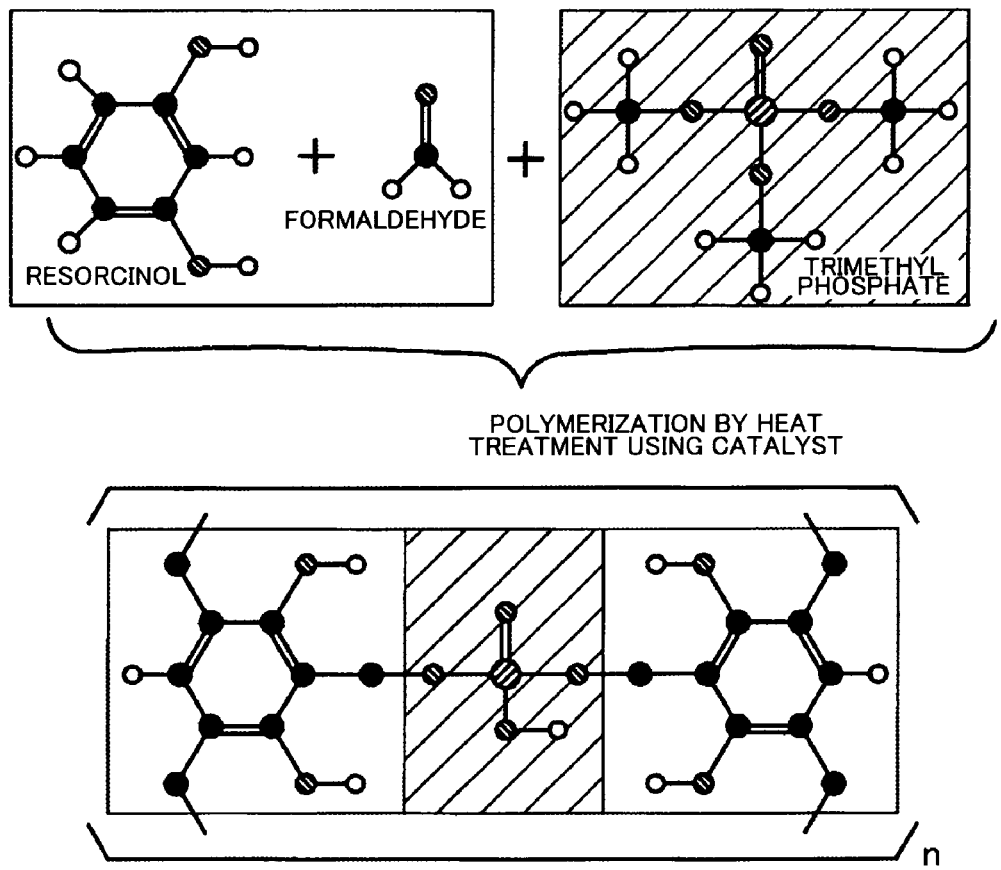
FIG. 4 is a schematic diagram which shows a structure of a polymer precursor.

First, description will be made regarding a manufacturing method for a mixed conductive carrier with reference to the following Chemical Formula 1 and FIG. 4 and FIG. 5.

[Chemical Formula 1]

Resorcinol (10 g) and formaldehyde (13 ml) are dissolved in water (40 ml), and a solution created by hydrolyzing trimethyl phosphate is added to this solution. The solution thus created is dehydrated with $Na_2CO_3$ as a catalyst so as to form a gel. The gel thus created is dried under 120° C. conditions, thereby obtaining a precursor (see FIG. 4).

The precursor is heat treated (800° C.) under a nitrogen atmosphere, thereby obtaining a mixed conductor. The mixed conductor has a structure in which an electron conductor phases 7 and 7 having a graphite-like structure and a proton conductor phase 9 formed of a phosphate group are alternately layered. The mixed conductor thus obtained is ground in a ball mill, thereby obtaining a mixed conductive carrier.

The measured conductivity of the mixed conductive carrier thus obtained is $1.3 \times 10^{-3}$ S/cm.

[Preparation of the Mixed Conductive Catalyst]

Next, a platinum catalyst is supported by the aforementioned mixed conductive carrier using a colloid method. That is to say, a Pt colloid solution is prepared employing chloroplatinic acid under conditions of 40° C. or less. The mixed conductive carrier is introduced into the colloid solution, and the colloid solution thus prepared is stirred such that platinum particles are supported by the mixed conductive carriers. Furthermore, the solution thus obtained is filtered and washed, and is heat treated under a hydrogen atmosphere, thereby obtaining a Pt supporting mixed conductive catalyst.

It should be noted that the dipping method may be employed, instead of the colloid method. In the dipping method, the ground mixed conductive carrier is introduced into a platinum diamino nitrite/methanol solution. After mixing, the solution thus created is dried, following which the mixed conductive carrier is subjected to reduction processing.

[Formation of the Reaction Layer on the Oxygen Electrode Side]

The reaction layer for the oxygen electrode is formed as follows, using the Pt supporting mixed conductive catalyst thus created. That is to say, the Pt supporting mixed conductive catalyst, water-repellent carbon (manufactured by Cabot cooperation, trade name "Vulcan XC-72") (70% by weight with respect to the Pt supporting mixed conductive catalyst), and a Nafion (trademark) solution are mixed, and the mixture thus created is applied to a gas diffusion layer formed of a carbon net, thereby forming a reaction layer on the oxygen electrode side.

[Formation of the Reaction Layer on the Hydrogen Electrode Side]

On the other hand, the reaction layer for the hydrogen electrode is formed as follows. That is to say, a catalyst including carbon supporting 40% Pt by weight is prepared, and the catalyst thus prepared is mixed with a Nafion (trade mark) solution. The mixture thus obtained is applied to a gas diffusion layer formed of a carbon net, thereby forming a reaction layer on the hydrogen electrode side.

[Formation of a Single Layer Cell of a Fuel Cell]

Figure 6:
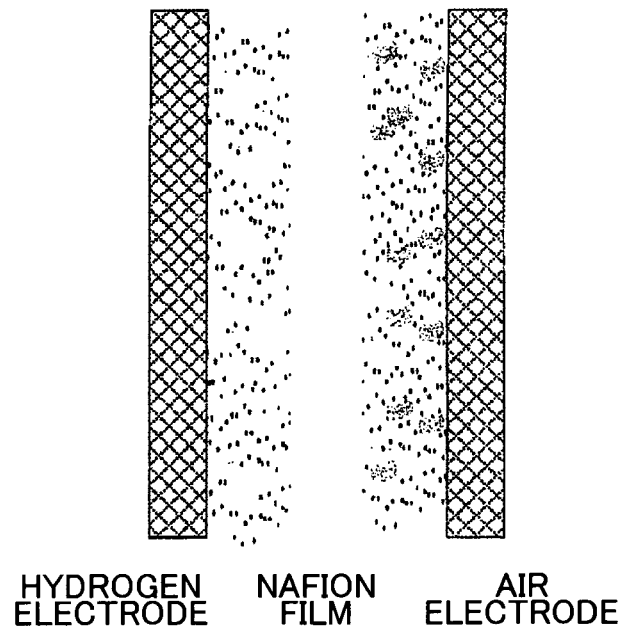
FIG. 6 is a schematic cross-sectional view which shows a fuel cell reaction layer according to the example.
Figure 7:
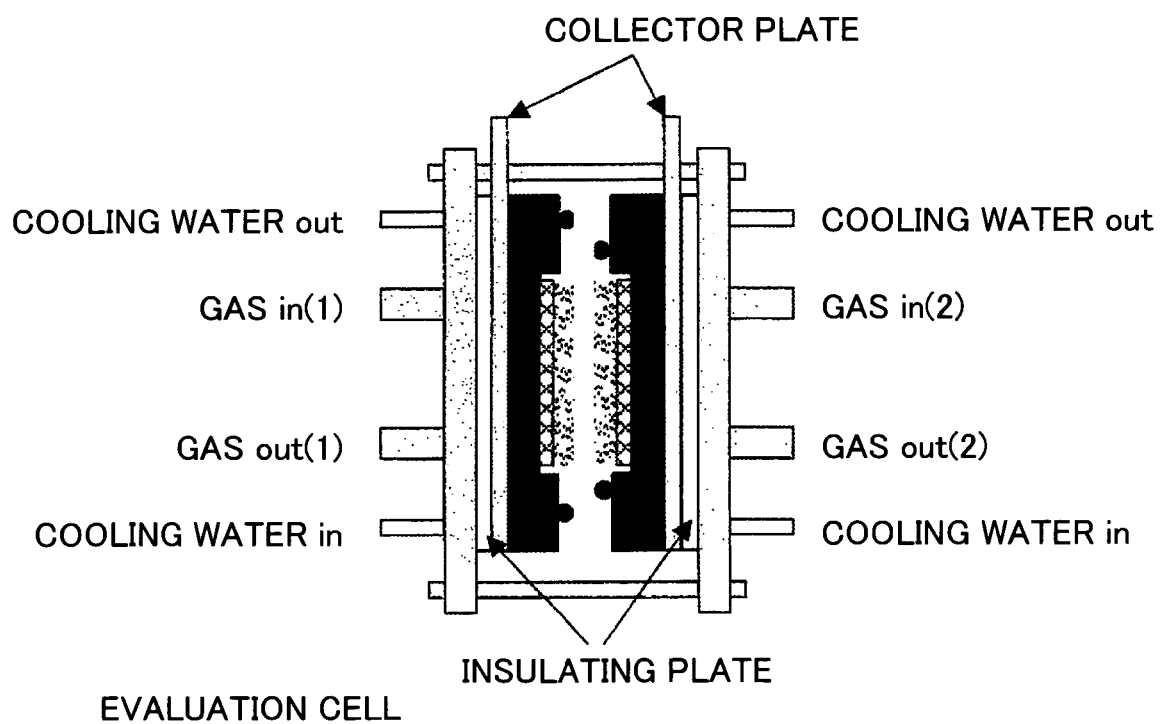
FIG. 7 is a schematic cross-sectional view which shows a single-layer cell of a fuel cell according to the example.

A Nafion film is sandwiched between the reaction layer on the oxygen electrode side and the reaction layer on the hydrogen electrode side thus formed, and these layers are pressure jointed by hot pressing, thereby forming a single unit (see FIG. 6). Furthermore, gas supply paths, i.e., an oxygen supply path and a hydrogen supply path, are formed on both sides as shown in FIG. 7, thereby completing a single layer cell of a fuel cell according to an Example 1.

Example 2

The Example 2 is generally the same as the Example 1, except that the amount of water-repellent carbon (manufactured by Cabot cooperation, trade name "Vulcan XC-72"), which is used for manufacturing the reaction layer on the oxygen electrode side, is 40% by weight with respect to the Pt supporting mixed conductive catalyst. The other steps are the same as those of Example 1, and accordingly, description thereof will be omitted.

Comparative Example 1

Figure 8:
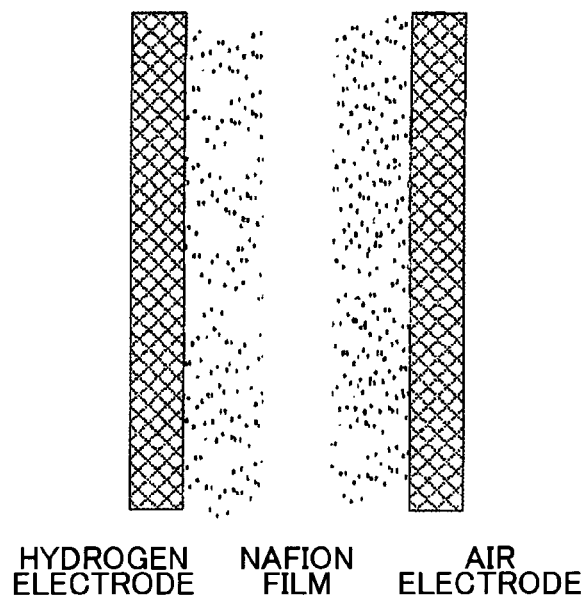
FIG. 8 is a schematic cross-sectional view which shows a fuel cell reaction layer according to a comparative example.

The Example 2 is generally the same as the Example 1, except that the reaction layer on the oxygen electrode side is manufactured without the addition of the water-repellent carbon (manufactured by Cabot cooperation, trade name "Vulcan XC-72") (see FIG. 8). The other steps are the same as those of Example 1, and accordingly, description thereof will be omitted.

[Evaluation]

The fuel cell characteristics were measured at 50° C. for the single layer cells of the fuel cells thus manufactured according to Example 1, Example 2, and Comparative Example 1, with hydrogen gas introduced into the reaction layer on the hydrogen electrode side, and with air introduced into the reaction layer on the air electrode side, at atmospheric pressure.

Figure 9:
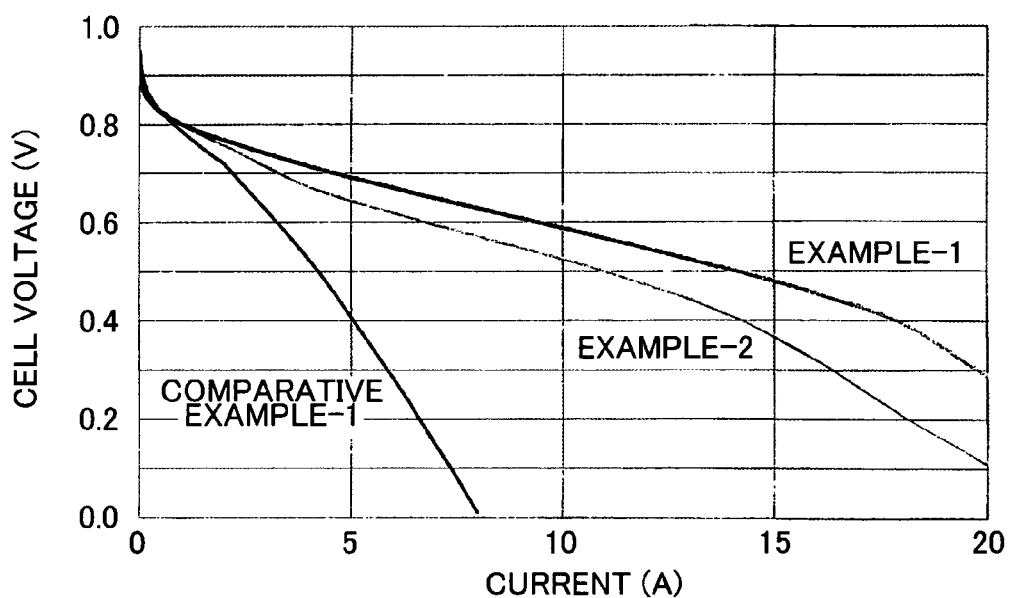
FIG. 9 is a graph which shows the current-voltage characteristics with respect to the examples 1 and 2 and the comparative example 1.

FIG. 9 shows the measurement results. It can be understood from this drawing that the single layer cells of the fuel cells according to Example 1 and Example 2 output a large cell voltage while the reduction in the cell voltage that occurs due to an increase in current was reduced, as compared with Comparative Example 1. The reason is that the reaction layer on the oxygen electrode side according to Example 1 or Example 2 includes water-repellent carbon as an addition, which accelerates the supply of oxygen gas, thereby relaxing the polarization that occurs due to material migration. Furthermore, with the Example 1, which includes a greater amount of water-repellent carbon (70% by weight), the polarization is further relaxed as compared with the Example 2, which includes a smaller amount of water-repellent carbon (40% by weight). From this fact, it can be understood that the addition of water-repellent carbon reduces the polarization.

Furthermore, in the test of the characteristics, the single layer cell of the fuel cell operates at 50° C., and exhibits the functions of both proton conductivity and electron conductivity. It is predicted that it would exhibit the same functions at a temperature of 200° C. or less in a zero-humidity atmosphere, depending upon the presence or absence of water.

In comparison with conventional inorganic catalyst supporting carriers which provide their functions at a high temperature of around 800° C., it can be understood that the mixed conductive catalysts according to the Examples having a structure in which platinum is supported by the mixed conductive carriers provide the functions of a fuel cell in an ordinary temperature range.

Figure 5:
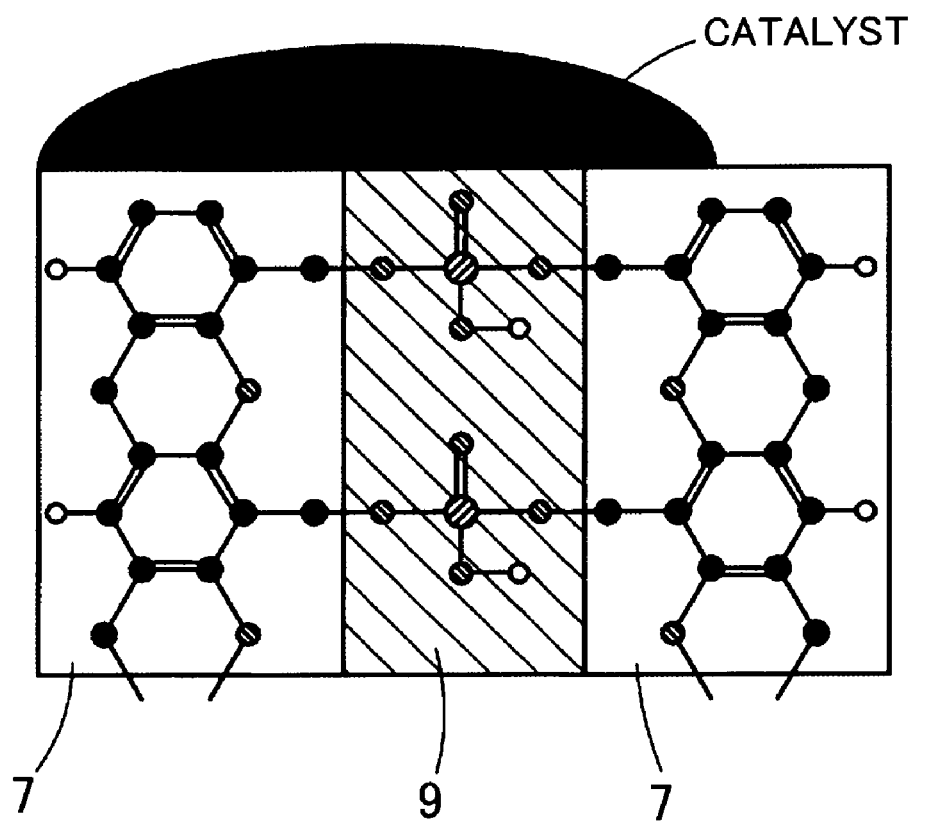
FIG. 5 is a schematic diagram which shows a structure of a mixed conductive catalyst according to an example.

Moreover, as can be clearly understood from the structure shown in FIG. 5, the electron conductive phase 7 and the proton conductive phase 9 are bonded together by covalent bonding, and accordingly, these phases are positioned extremely close to each other. This permits the electron conductor 7 and the proton conductor 9 to make contact with a catalyst particle even if the size of the catalyst particle is extremely small. This allows the electrons and protons, which are necessary for the catalysis reaction, to be supplied at suitable amounts. Such an arrangement improves the efficiency of the catalyst, thereby improving the efficiency of the fuel cell.

[Other Preparation Methods for a Mixed Conductive Carrier]

The mixed conductive carriers may be formed using the following methods, instead of the preparation method according to the above-described Examples.

Another Preparation Method for a Mixed Conductive Carrier (1)

[Chemical Formula 2]

As represented by the aforementioned Chemical Formula 2, resorcinol (5 g) is dissolved in pure water (20 ml), and formaldehyde (6.7 ml) is added to the solution thus created. Furthermore, trimethyl phosphate (5.2 ml) is introduced into a mixed solution of pure water (3.2 ml), ethanol (10.5 ml), and hydrochloric acid (124 μl), and the mixed solution is agitated for one hour so as to hydrolyze the trimethyl phosphate. After the hydrolyzed trimethyl phosphate solution is added to the resorcinol/formaldehyde solution, $Na_2CO_3$ (0.47 g) is added to the solution. Subsequently, the solution thus created is left at room temperature for 24 hours so as to form a gel.

The gel thus obtained is ground, and the gel thus ground is introduced into a mixed solution of trimethyl phosphate (5.2 ml), pure water (3.2 ml), ethanol (10.5 ml), and hydrochloric acid (124 μl), and is refluxed at an oil bath temperature of 200° C. for 4 hours. The sample thus obtained is filtered and dried, following which the sample is heat treated (at 1000° C., for 4 hours) under an inert gas atmosphere, thereby obtaining a mixed conductive carrier.

The measured proton conductivity of the mixed conductive carrier thus obtained is $5.6 \times 10^{-3}$ S/cm, which is superior to that of the mixed conductive carrier employed in Example 1. From this fact, it is clear that heat processing of the precursor improves the proton conductivity.

Yet Another Preparation Method for a Mixed Conductive Carrier (2)
[Chemical Formula 3]

As represented by the aforementioned Chemical Formula 3, a hydrolyzed trimethyl phosphate solution obtained by agitating for one hour a mixed solution of pure water (2.6 ml), ethanol (5.0 ml), and hydrochloric acid (99 μl), containing trimethyl phosphate (4.2 ml), is added to another solution obtained by dissolving resorcinol (2 g) and formaldehyde (2.7 ml) in pure water (8 ml). Furthermore, $Na_2CO_3$ (0.19 g) is added to this solution, following which the solution thus created is agitated at room temperature for 3 hours. Subsequently, this solution is left at 60° C. for 24 hours, and at 80° C. for 24 hours.

Subsequently, the sample is heated in an autoclave at 150° C. for 6 hours. The sample stored in the autoclave is pressurized up to around 3 to 4 Mpa due to the self-generated pressure of the solvent etc.

The sample thus obtained is filtered and dried, following which the sample is subjected to heat processing (at 800° C. for 4 hours) under an inert gas atmosphere, thereby obtaining a mixed conductive carrier.

The measured proton conductivity of the mixed conductive carrier thus obtained is $1.5 \times 10^{-2}$ S/cm, which is superior to that obtained using a method in which the precursor is obtained by performing heat processing at 200° C. From this fact, it is clear that the application of pressure by means of an autoclave or the like further improves the proton conductivity as compared with an arrangement employing only the heat processing.

Yet Another Preparation Method for a Mixed Conductive Carrier (3)

2 g Phenol is dissolved in a mixed solution of 30 cc pure water and 5 cc ethanol, and a 3.15 cc formaldehyde solution is further added to the solution. Furthermore, a 4.89 cc trimethyl phosphate solution is added to the solution, following which the solution is agitated for one hour. Subsequently, 0.089 g sodium carbonate is added to the solution, following which the solution is agitated overnight at room temperature. Then, the solution is sealed, and the sealed solution is left at 70° C. for 24 hours, following which the solvent is removed. The sample thus obtained is subjected to heat processing at 500° C. under a nitrogen gas atmosphere for 4 hours, thereby obtaining a catalyst supporting carrier according to the Example.

Yet Another Preparation Method for a Mixed Conductive Carrier (4)

2 g pyrogallol is dissolved in 8 cc pure water, and a 2.36 cc formaldehyde solution is further added to the solution. Furthermore, a 3.65 cc trimethyl phosphate solution is added to the solution, following which the solution is agitated for one hour. Subsequently, 0.0167 g sodium carbonate is added to the solution, following which the solution is agitated at room temperature for 3 hours. Then, the solution is sealed, and the sealed solution is left at 50° C. for 24 hours, following which the solution is further left at 80° C. for 72 hours. The gel thus obtained is subjected to heat processing at 800° C. under a nitrogen gas atmosphere for 4 hours, thereby obtaining a catalyst supporting carrier according to the Example.

Yet Another Preparation Method for a Mixed Conductive Carrier (5)

3 g dihydroxybiphenyl is dissolved in an ethanol/water mixed solution prepared at a volume ratio of 1:1, and a 4.84 cc formaldehyde solution is added to the mixed solution. Furthermore, a 7.49 cc trimethyl phosphate solution is added to the solution, following which the solution is agitated for one hour. Subsequently, 0.0683 g sodium carbonate is added to the solution, following which the solution is agitated at room temperature for 3 hours. Then, the solution is sealed, and the sealed solution is left at 50° C. for 24 hours, following which the solution is further left at 80° C. for 72 hours. Then the solvent is removed by evaporation. The sample thus obtained is subjected to heat processing at 500° C. under a nitrogen gas atmosphere for 4 hours, thereby obtaining a catalyst supporting carrier according to the Example.

Yet Another Preparation Method for a Mixed Conductive Carrier (6)

3 g resorcinol is dissolved in 12 cc pure water, and a 4.05 cc formaldehyde solution is further added to the solution. Furthermore, a 0.736 cc trimethyl phosphate solution is gradually added to the solution while the solution is agitated. Then, the solution is sealed, and the sealed solution is left at 70° C. for 24 hours, following which the solvent is removed. The sample thus obtained is subjected to heat processing at 1000° C. under a nitrogen gas atmosphere for 4 hours, thereby obtaining a catalyst supporting carrier according to the Example.

Yet Another Preparation Method for a Mixed Conductive Carrier (7)

3 g resorcinol is dissolved in 12 cc pure water, and a 4.05 cc formaldehyde solution is further added to the solution. Furthermore, 0.028 g sodium carbonate is added to the solution. Then, the solution is sealed, and the sealed solution is left at 50° C. for 24 hours, following which the solution is further left at 80° C. for 72 hours. Then, the gel thus obtained is ground. The gel thus ground is subjected to cleaning processing using a 0.1 N hydrochloric acid solution, pure water, and ethanol, in that order.

Then, the gel thus cleaned is soaked in a solution created by dissolving 1.5 g tungstophosphoric acid into 50 cc ethanol. After the gel is thus soaked at 50° C. for 48 hours, the gel is subjected to heat processing at 700° C. under a nitrogen gas atmosphere for 4 hours, thereby obtaining a catalyst supporting carrier according to the Example.

Yet Another Preparation Method for a Mixed Conductive Carrier (8)

3 g resorcinol is dissolved in 12 cc pure water, and a 4.05 cc formaldehyde solution is further added to the solution. Then, another solution prepared by dissolving 2.18 g phenylphosphonic acid in an ethanol/water mixed solution prepared at a volume ratio of 1:1 is added to the former solution. Furthermore, 0.114 g sodium carbonate is added to the solution. Then, the solution is agitated at room temperature for 12 hours. Subsequently, the solution is sealed, and the sealed solution is left at 60° C. for 24 hours, following which the solution is further left at 80° C. for 48 hours. Then, the sample gel thus obtained is subjected to heat processing at 800° C. under a nitrogen gas atmosphere for 4 hours, thereby obtaining a catalyst supporting carrier according to the Example.

The samples thus obtained using the other preparation methods (3) through (8) for the mixed conductive carrier were ground by means of a ball mill, and samples, with a diameter of 15 mm and with a thickness of approximately 3 mm, were formed by pressing. The electron resistivity was obtained as follows. First, each sample thus prepared was sandwiched between gold collector plates. The electron resistivity was then obtained based upon the voltage measured when a DC current was applied to each of the samples thus prepared. Furthermore, the ion conductivity was obtained as follows. First, each sample thus prepared was sandwiched between a Nafion film and a catalyst layer so as to form a holder. These holders were stored in a container, following which nitrogen gas or hydrogen gas at 60° C. and at a humidity of 100% was introduced to this container. Then, voltage was applied to each holder, and the ion conductivity was obtained based upon the response current thereof.

The results are shown in Table 1.

TABLE 1

|  | Electron resistivity ($\Omega$, cm) | Proton conductivity (S/CM) |
| --- | --- | --- |
| Preparation method (3) | 10 | $7.1 \times 10^{-4}$ |
| Preparation method (4) | 0.18 | $1.1 \times 10^{-2}$ |
| Preparation method (5) | 50 | $5.3 \times 10^{-4}$ |
| Preparation method (6) | 0.07 | $1.0 \times 10^{-3}$ |
| Preparation method (7) | 0.14 | $1.5 \times 10^{-4}$ |
| Preparation method (8) | 0.14 | $2.7 \times 10^{-3}$ |

In order to confirm the stability of each sample with regard to water, a 0.1 g sample was soaked in pure water at room temperature, and the relation between the soaking time and the phosphorus concentration of each sample was measured (tungsten concentration was measured with respect to a sample prepared by the preparation method (7)). It has been confirmed that the phosphorus concentration of each sample (tungsten concentration was measured with respect to a sample prepared by the preparation method (7)) was almost stable after 50 hours had elapsed after soaking. Specifically, it has been confirmed that the phosphorus concentration of each sample (tungsten concentration was measured with respect to a sample prepared by the preparation method (7)) remains, with the initial concentration as the reference, 45% with respect to the preparation method (3), 81% with respect to the preparation method (4), 86% with respect to the preparation method (5), 90% with respect to the preparation method (6), 95% with respect to the preparation method (7), and 75% with respect to the preparation method (8).

The invention is by no means intend to be limited by the above-described embodiments and description of examples. Rather, various modifications may be made by those skilled in this art without departing from the scope of the appended claims, which are also encompassed by the invention.

The invention claimed is:

1. A fuel cell reaction layer of an oxygen electrode, the reaction layer formed of a mixed conductive catalyst comprising:
   a catalyst;
   a mixed conductive carrier on which the catalyst is supported, the mixed conductive carrier being composed of inorganic electron conductor portions and inorganic proton conductor portions; and
   a water-repellent agent;
   wherein the inorganic electron conductor portions comprise a polymerized and carbonized organic monomer, and
   wherein the inorganic electron conductor portions are in the form of carbon principal chains and the inorganic proton conductor portions are stably fixed to the carbon principal chains by covalent bonding or by intercalation.

2. The fuel cell reaction layer according to claim 1, wherein the organic monomer is at least one compound selected from the group consisting of acetylene, resorcinol, phenol, 2-phenylphenol, aniline, pyrrole, thiophene, phenylphosphonic acid, phenylsilane-alkoxide group, pyrogallol, and dihydroxybiphenyl.

3. The fuel cell reaction layer according to claim 1, wherein the inorganic monomer is at least one compound selected from compounds containing phosphorous, compounds containing sulfur, carboxylic acids, boric acid, and inorganic solid acids.

4. The fuel cell reaction layer according to claim 1, wherein the electron conductor comprises a carbon material.

5. The fuel cell reaction layer according to claim 1, wherein the electron conductor has carbon-carbon bonding including carbon-carbon double bonding.

6. The fuel cell reaction layer according to claim 1, wherein the catalyst is a noble metal.

7. The fuel reaction layer according to claim 1, wherein the water-repellent agent is an electron conductor.

8. The fuel cell reaction layer according to claim 7, wherein the water-repellent agent is carbon.

* * * * *